US012562403B2

(12) United States Patent
Lee et al.

(10) Patent No.: US 12,562,403 B2
(45) Date of Patent: Feb. 24, 2026

(54) SECONDARY BATTERY

(71) Applicant: Samsung SDI Co., Ltd., Yongin-si (KR)

(72) Inventors: Won Ik Lee, Yongin-si (KR); Gun Gue Park, Yongin-si (KR); In Young Jang, Yongin-si (KR); Jung Hyun Park, Yongin-si (KR); Joo Youn Shin, Yongin-si (KR); Ju Shik Uhm, Yongin-si (KR); Hyun Ki Jeong, Yongin-si (KR); Mun Sung Kim, Yongin-si (KR); Ye Eun Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 551 days.

(21) Appl. No.: 17/997,207

(22) PCT Filed: Jun. 23, 2021

(86) PCT No.: PCT/KR2021/007890
§ 371 (c)(1),
(2) Date: Oct. 26, 2022

(87) PCT Pub. No.: WO2022/035043
PCT Pub. Date: Feb. 17, 2022

(65) Prior Publication Data
US 2023/0187707 A1 Jun. 15, 2023

(30) Foreign Application Priority Data
Aug. 10, 2020 (KR) ........................ 10-2020-0099942

(51) Int. Cl.
*H01M 10/0587* (2010.01)
*H01M 10/0585* (2010.01)
(Continued)

(52) U.S. Cl.
CPC ... *H01M 10/0587* (2013.01); *H01M 10/0585* (2013.01); *H01M 50/107* (2021.01); *H01M 50/627* (2021.01)

(58) Field of Classification Search
CPC ......... H01M 10/0587; H01M 10/0431; H01M 50/538; H01M 50/107; H01M 50/627; H01M 10/0585
See application file for complete search history.

(56) References Cited

U.S. PATENT DOCUMENTS 8,252,440 B2 8/2012 Yamashita et al.
8,574,749 B2 11/2013 Chun
(Continued)

FOREIGN PATENT DOCUMENTS

CN 106549132 A 3/2017
JP 10-208724 A 8/1998
(Continued)

OTHER PUBLICATIONS

International Search Report of PCT/KR2021/007890, Sep. 30, 2021, 5 pages.
(Continued)

*Primary Examiner* — Sarah A. Slifka
(74) *Attorney, Agent, or Firm* — Womble Bond Dickinson (US) LLP

(57) ABSTRACT

The present invention relates to a secondary battery supporting the center part of an electrode assembly to enhance stability and reliability. For example, disclosed is a secondary battery comprising: an electrode assembly formed by winding a first electrode plate, a separator and a second electrode plate; a case for accommodating the electrode assembly; a current collection plate electrically connected to the first electrode plate and coupled to the upper part of the electrode assembly; and a core insulation member coupled
(Continued)

to a winding center of the electrode assembly at the upper part of the current collection plate, wherein the core insulation member includes an insertion part having an inner hole, and a flange part extending in the horizontal direction from the upper end of the insertion part.

20 Claims, 8 Drawing Sheets

(51) Int. Cl.
  *H01M 50/107*     (2021.01)
  *H01M 50/627*     (2021.01)

(56) References Cited

U.S. PATENT DOCUMENTS

| | | | |
|---|---|---|---|
| 9,350,004 | B2 | 5/2016 | Kim |
| 10,411,242 | B2 | 9/2019 | Doo et al. |

| | | | |
|---|---|---|---|
| 2009/0226799 | A1 | 9/2009 | Yamashita et al. |
| 2009/0233160 | A1 | 9/2009 | Kim |
| 2011/0086261 | A1 | 4/2011 | Chun |
| 2017/0084901 | A1 | 3/2017 | Doo et al. |
| 2017/0373339 | A1 | 12/2017 | Cho et al. |

FOREIGN PATENT DOCUMENTS

| | | | |
|---|---|---|---|
| JP | 2001-68163 | A | 3/2001 |
| JP | 2002-75435 | A | 3/2002 |
| KR | 10-2004-0110595 | A | 12/2004 |
| KR | 10-2009-0096349 | A | 9/2009 |
| KR | 10-0917742 | B1 | 9/2009 |
| KR | 10-2011-0040641 | A | 4/2011 |
| KR | 10-2016-0110610 | A | 9/2016 |

OTHER PUBLICATIONS

Chinese Office Action dated Apr. 4, 2025, issued in corresponding Chinese Patent Application No. 202180020446.9 (7 pages).
Korean Office Action dated Sep. 22, 2025, issued in corresponding Korean Patent Application No. 10-2020-0099942 (6 pages).

260

262

265

261

260

262

265

T1

261

T2

360

365

361

362

360

365

361

T1

362

460

465

467

T1

461

462

560

565

561a

561

SECONDARY BATTERY

CROSS-REFERENCE TO RELATED APPLICATIONS

This application is a U.S. National Phase Patent Application of International Application Number PCT/KR2021/007890, filed on Jun. 23, 2021, which claims priority to Korean Patent Application Number 10-2020-0099942, filed on Aug. 10, 2020, the entire content of each of which is incorporated herein by reference.

TECHNICAL FIELD

The present invention relates to a secondary battery.

BACKGROUND ART

Unlike primary batteries that generally cannot be recharged, secondary batteries may be recharged. A low-capacity secondary battery comprised of one single battery cell may be used as the power source for various portable small-sized electronic devices, such as smart phones, feature phones, notebook computers, digital cameras, and camcorders. A high-capacity secondary battery in which several tens of battery cells are connected in a battery pack may be used as the power source for motor drives, such as those in hybrid vehicles or electric vehicles. Such a lithium ion secondary battery may be classified into cylindrical, prismatic and pouch type secondary batteries in terms of configuration.

Specifically, a cylindrical secondary battery generally includes a cylindrical electrode assembly, a cylindrical case to which the electrode assembly is coupled, an electrolyte that is injected into the case to enable movement of lithium ions, and a cap assembly that is coupled to one side of the case to prevent leakage of electrolyte and to prevent separation of the electrode assembly.

The above information disclosed in this Background section is only for enhancement of understanding of the background of the invention and therefore it may contain information that does not constitute prior art.

DESCRIPTION OF EMBODIMENTS

Technical Problem

The present invention provides a secondary battery supporting the center part of an electrode assembly to enhance stability and reliability.

Solution to Problem

A secondary battery according to the present invention may include: an electrode assembly formed by winding a first electrode plate, a separator and a second electrode plate; a case for accommodating the electrode assembly; a current collection plate electrically connected to the first electrode plate and coupled to the upper part of the electrode assembly; and a core insulation member coupled to a winding center of the electrode assembly at the upper part of the current collection plate, wherein the core insulation member includes an insertion part having an inner hole, and a flange part extending in the horizontal direction from the upper end of the insertion part.

The current collection plate may include a center hole formed in the center, and the insertion part may be inserted into the electrode assembly through the center hole.

The length of the insertion part may be greater than a length in which the first electrode plate protrudes from an upper end of the separator.

The insertion part may be formed vertically from the flange part.

The upper diameter and the lower diameter of the inner hole may be equal to each other, and the thickness of the upper end of the insertion part may be greater than the thickness of the lower end.

The upper diameter of the inner hole may be greater than the lower diameter, and the thicknesses of the upper end and the lower end of the insertion part may be equal to each other.

The core insulation member may be positioned between the flange part and the insertion part and may further include a fixing groove to which the current collection plate is fixed.

The insertion part may include a cutout part that extends from the top to the bottom and separates the insertion part into a plurality of regions.

When an electrolyte is injected into the case, the cutout part may be opened.

The core insulation member may further include an extension part that extends in the horizontal direction from one side of the flange part to cover a portion of the current collection plate.

Advantageous Effects of Disclosure

In the secondary battery according to an embodiment of the present invention, by including a core insulation member coupled to the winding center of the electrode assembly, the central portion of the electrode assembly can be prevented from collapsing after electrolyte injection, thereby enhancing stability and reliability of the secondary battery.

BEST MODE

Hereinafter, preferred embodiments of the present invention will be described in detail with reference to the accompanying drawings.

Examples of the present invention are provided to more completely explain the present invention to those skilled in the art, and the following examples may be modified in various other forms. The present invention, however, may be embodied in many different forms and should not be construed as being limited to the example embodiments set forth herein. Rather, these example embodiments are provided so that this disclosure will be thorough and complete and will convey the aspects and features of the present invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

Figure 1:
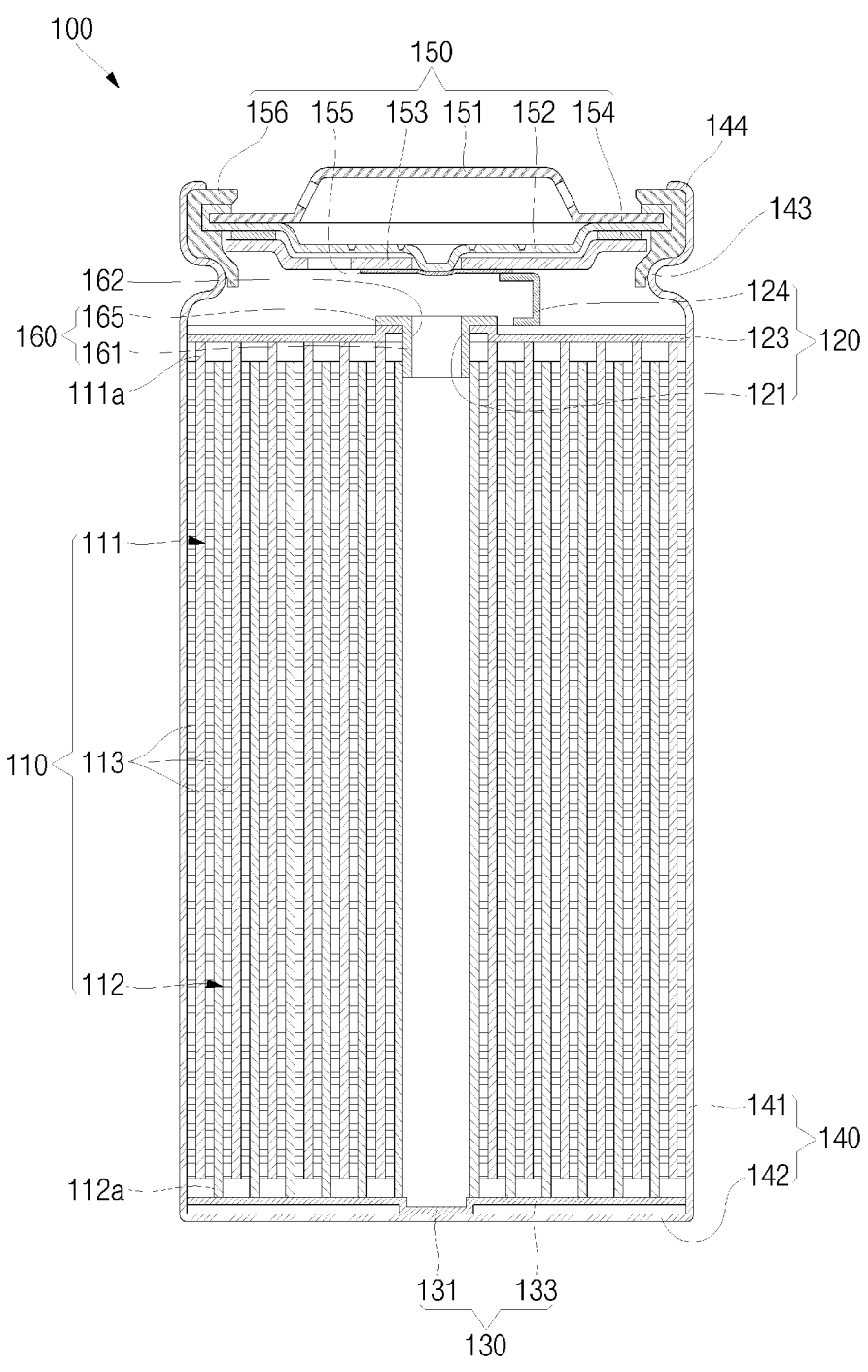
FIG. 1 is a cross-sectional view showing a secondary battery according to an embodiment of the present invention.
Figure 2:
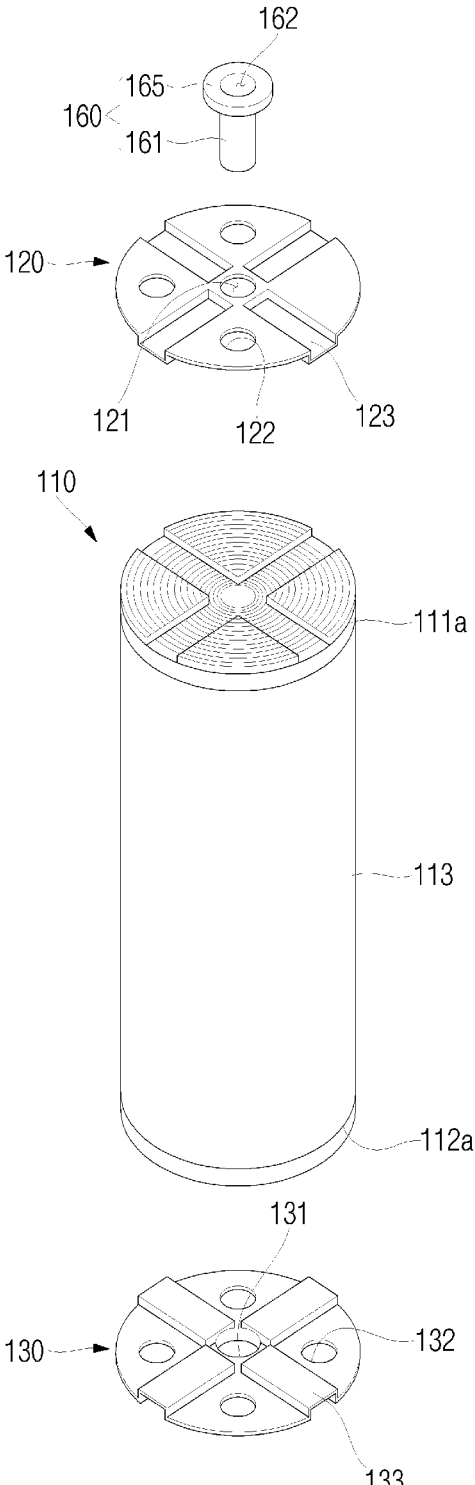
FIG. 2 is an exploded perspective view showing a part of a secondary battery.
Figure 3A:
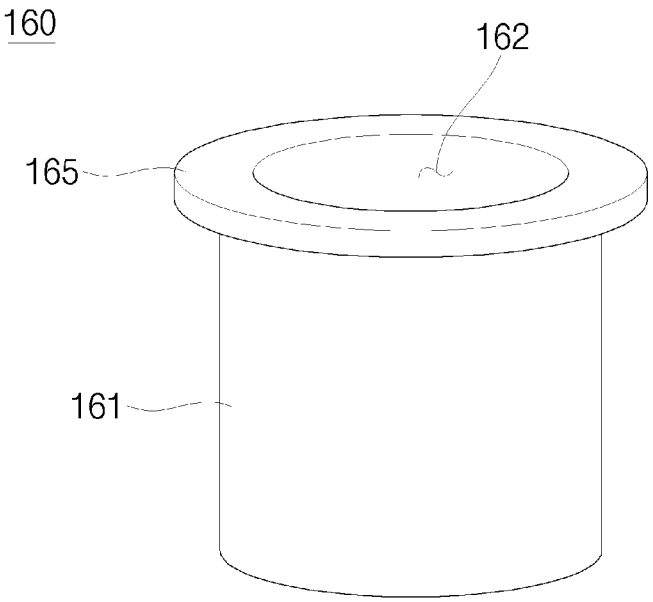
FIG. 3A is a perspective view showing a core insulation member according to an embodiment of the present invention.
Figure 3B:
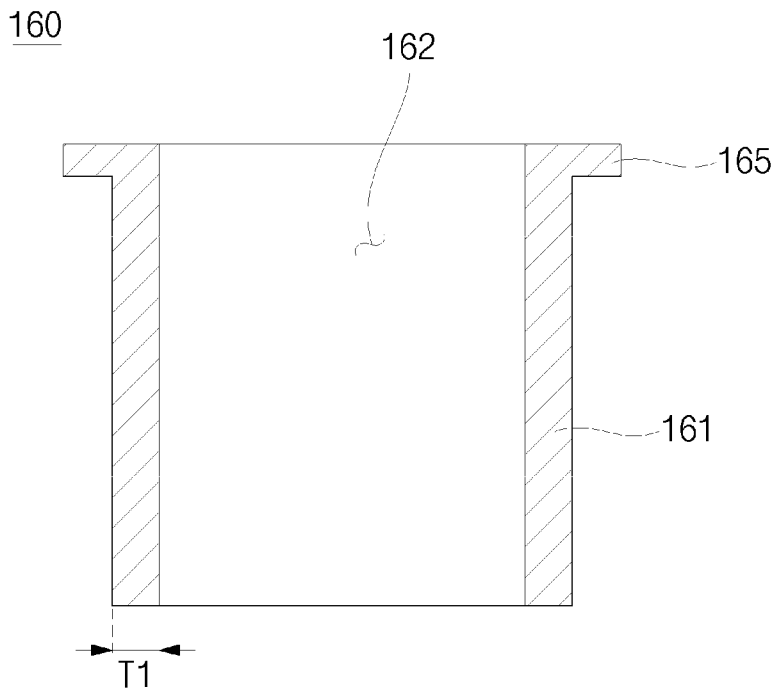
FIG. 3B is a cross-sectional view thereof.

FIG. 1 is a cross-sectional view showing a secondary battery according to an embodiment of the present invention. FIG. 2 is an exploded perspective view showing a part of a secondary battery. FIG. 3A is a perspective view showing a core insulation member according to an embodiment of the present invention, and FIG. 3B is a cross-sectional view thereof.

Referring to FIGS. 1 and 2, the secondary battery 100 according to an embodiment of the present invention includes an electrode assembly 110, a first current collection plate 120, a second current collection plate 130, a case 140, a cap assembly 150 and a core insulation member 160.

The electrode assembly 110 may include a first electrode plate 111 and a second electrode plate 112, and a separator 113 interposed between the first electrode plate 111 and the second electrode plate 112. The electrode assembly 110 may be formed by winding a laminate of the first electrode plate 111, the separator 113, and the second electrode plate 112 in the form of a jelly-roll. Here, the first electrode plate 111 may act a positive electrode, and the second electrode plate 112 may act as a negative electrode.

The first electrode plate 111 may be formed by applying a first electrode active material, such as a transition metal oxide, to a first electrode current collector formed of a metal foil, such as aluminum. In the first electrode plate 111, a first electrode uncoated portion 111a to which the first electrode active material is not applied may be formed. The first electrode uncoated portion 111a may protrude to an upper portion of the electrode assembly 110 to be electrically connected to the first current collection plate 120. In some examples, the first electrode uncoated portion 111a may protrude above the second electrode plate 112 and the separator 113.

The second electrode plate 112 may be formed by applying a second electrode active material, such as graphite or carbon, to a second electrode current collector formed of a metal foil, such as copper or nickel. In the second electrode plate 112, a second electrode uncoated portion 112a to which the second electrode active material is not applied may be formed. The second electrode uncoated portion 112a may protrude to a lower portion of the electrode assembly 110 to be electrically connected to the second current collection plate 130. In some examples, the second electrode uncoated portion 112a may protrude lower than the first electrode plate 111 and the separator 113.

The first current collection plate 120 may be coupled to the upper portion of the electrode assembly 110 and may be electrically connected to the first electrode uncoated portion 111a. The first current collection plate 120 may be formed of a circular plate to correspond to a transverse cross-section of the electrode assembly 110. The first current collection plate 120 may include a center hole 121, a peripheral hole 122, a welding part 123, and a lead tab 124.

The center hole 121 may be located at the center of the first current collection plate 120, and the peripheral hole 122 may be located on the outer periphery of the center hole 121. An electrolyte may be injected into the case 140 through the center hole 121 and the peripheral hole 122. In addition, a core insulation member 160 may be coupled to the center hole 121.

The lead tab 124 may be electrically connected to one side of the first current collection plate 120. The peripheral hole 122 may not be formed in a portion of the first current collection plate 120 to which the lead tab 124 is connected. The lead tab 124 may be connected to the cap assembly 150 to electrically connect the first current collection plate 120 to the cap assembly 150. That is, one end of the lead tab 124 may be electrically connected to the first current collection plate 120, and the other end of the lead tab 124 may be electrically connected to the cap assembly 150. Of course, the lead tab 124 may be integrally formed with the first current collection plate 120. For example, a portion of the first current collection plate 120 may be formed to extend to constitute a lead tab 124, and the lead tab 124 may be bent to be electrically connected to the cap assembly 150.

The welding part 123 is formed in the form of a groove protruding downward from the first current collection plate 120, and a plurality of welding parts may be formed. For example, as shown in FIG. 2, the welding part 123 includes four grooves and may be arranged in a '+' shape. That is, the respective welding parts 123 may be arranged to be spaced apart from each other at intervals of 90 degrees with respect to the center of the first current collection plate 120. Meanwhile, in the present invention, the number of welding parts 123 is not limited, and the number of welding parts 123 may be not less than 4 or less. In some examples, the welding part 123 may be positioned between the peripheral holes 122. The welding part 123 may be welded to the first electrode uncoated portion 111a of the electrode assembly 110. In this case, the welding part 123 may be connected to the first electrode uncoated portion 111a by laser welding, ultrasonic welding, resistance welding, or the like.

The second current collection plate 130 may be coupled to a lower portion of the electrode assembly 110 and may be electrically connected to the second electrode uncoated portion 112a. The second current collection plate 130 may be formed of a circular plate to correspond to a transverse cross-section of the electrode assembly 110. The second current collection plate 130 may include a connection part 131, a peripheral hole 132, and a welding part 133.

The connection part 131 may be formed to protrude downward from the second current collection plate 130. The connection part 131 may be formed approximately at the center of the second current collection plate 130 and may be electrically connected to a bottom plate 142 of the case 140 to be described later. In some examples, the connection part 131 may be formed in a portion corresponding to the center hole 121 of the first current collection plate 120. For example, the connection part 131 may be electrically connected to the case 140 by laser welding, ultrasonic welding, resistance welding, or the like.

The peripheral hole 132 may be formed around the connection part 131. The peripheral holes 132 are holes through which an electrolyte moves, and a plurality of peripheral holes 132 may be formed in the second current collection plate 130. In some examples, the peripheral hole 132 may be formed between the welding parts 133.

The welding part 133 is formed in the form of a groove protruding upward from the second current collection plate 130, and a plurality of welding parts 133 may be formed. For example, as shown in FIG. 2, the welding part 133 may have four grooves and may be arranged in a '+' shape. That is, the welding part 133 may be formed in the same manner as the welding part 123 of the first current collection plate 120, but differs in that only the protruding directions are opposite to each other. The welding part 133 may be welded to the second electrode uncoated portion 112a of the electrode assembly 110. Here, the welding part 133 may be connected to the second electrode uncoated portion 112a by laser welding, ultrasonic welding, resistance welding, or the like.

The case 140 includes a side plate 141 that is a cylindrical body having a predetermined diameter to form a space in which the electrode assembly 110 is accommodated, and a bottom plate 142 that seals the lower portion of the side plate 141. After the electrode assembly 110 is inserted, a top opening of the case 140 is opened to seal the electrode assembly 110. A beading part 143 for preventing the electrode assembly 110 from moving may be formed at the upper portion of the case 140. In addition, a crimping part 144 for fixing the cap assembly 150 is formed at the uppermost end of the case 140.

The cap assembly 150 includes a cap up 151, a safety vent 152 coupled to the lower portion of the cap up 151, a cap down 153 coupled to the lower portion of the safety vent 152, an insulator 154 positioned between the safety vent 152 and the cap down 153, a sub plate 155 coupled to the lower portion of the cap down 133 and electrically connected to the safety vent 152, and a gasket 156 interposed between the outer periphery of the safety vent 152 and the case 140. The sub-plate 155 is electrically connected to the lead tab 124 of the first current collection plate 120.

The core insulation member 160 may be coupled to the center of the electrode assembly 110. Specifically, the core insulation member 160 is coupled to the center hole 121 of the first current collection plate 120 coupled to the upper portion of the electrode assembly 110, and may be located at the center of the winding of the electrode assembly 110. In some examples, the core insulation member 160 may be formed of an insulating material. The core insulation member 160 may include an insertion part 161 and a flange part 165.

The insertion part 161 may be shaped of a cylinder having an inner hole 162. An electrolyte may be injected into the case 140 through the inner hole 162. In some examples, the upper diameter and the lower diameter of the inner hole 162 may be equal to each other. The insertion part 161 may extend downward from the flange part 165. In some examples, the insertion part 161 may be formed vertically from the flange part 165. The insertion part 161 may penetrate the center hole 121 of the first current collection plate 120 and be inserted into the winding center of the electrode assembly 110. Here, since the insertion part 161 is inserted into the center hole 121, the diameter of the inner hole 162 is smaller than the diameter of the center hole 121. The insertion part 161 may be inserted into the center of the electrode assembly 110 to prevent the first electrode plate 111, the second electrode plate 112, or the separator 113 from being bent or collapsing toward the center of the electrode assembly 110.

The length of the insertion part 161 may be greater than the length of the first electrode uncoated portion 111a. Since the first electrode uncoated portion 111a protrudes higher than the separator 113 and the second electrode plate 112, the insertion part 161 should be formed to have a greater length than at least the first electrode uncoated portion 111a, and thus can simultaneously support the first electrode plate 111, the second electrode plate 112, and the separator 113. In some examples, the length of the insertion part 161 may be greater than a length in which the first electrode plate 111 protrudes from the separator 113 in the electrode assembly 110. In addition, the thickness T1 of the insertion part 161 may be formed so that the upper end and the lower end are equal to each other.

The flange part 165 may be formed to extend outwardly (in the horizontal direction) from the top of the insertion part 161. The flange part 165 may extend to the outside of the inner hole 162 and may partially cover an upper portion of the first current collection plate 120. For example, the flange part 165 may extend to the outside of the center hole 121 of the first current collection plate 120 in a substantially ring shape. In some examples, the flange part 165 may not cover the peripheral hole 122 and the welding part 123.

As described above, the core insulation member 160 may be coupled to the winding center of the electrode assembly 110 to support the electrode assembly 110, thereby preventing the central portion of the electrode assembly 110 from collapsing after the electrolyte is injected, thereby enhancing the stability and reliability of the secondary battery 100.

Hereinafter, various embodiments of the core insulation member will be described.

Figure 4A:
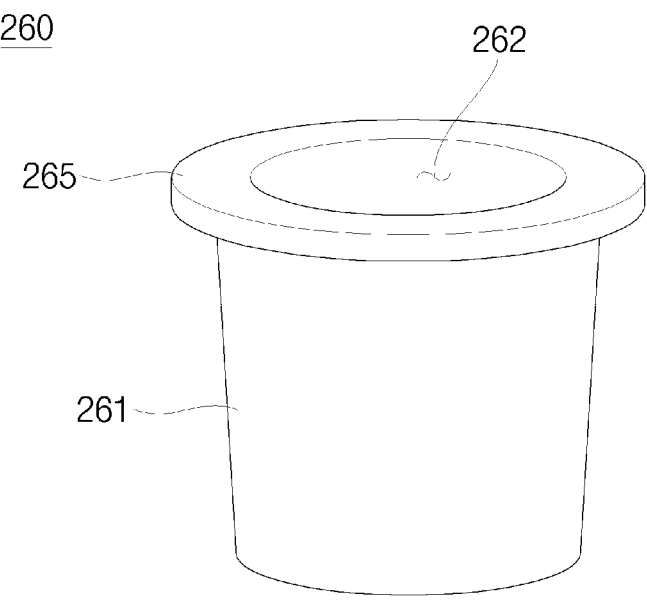
FIG. 4A is a perspective view showing a core insulation member according to another embodiment of the present invention.
Figure 4B:
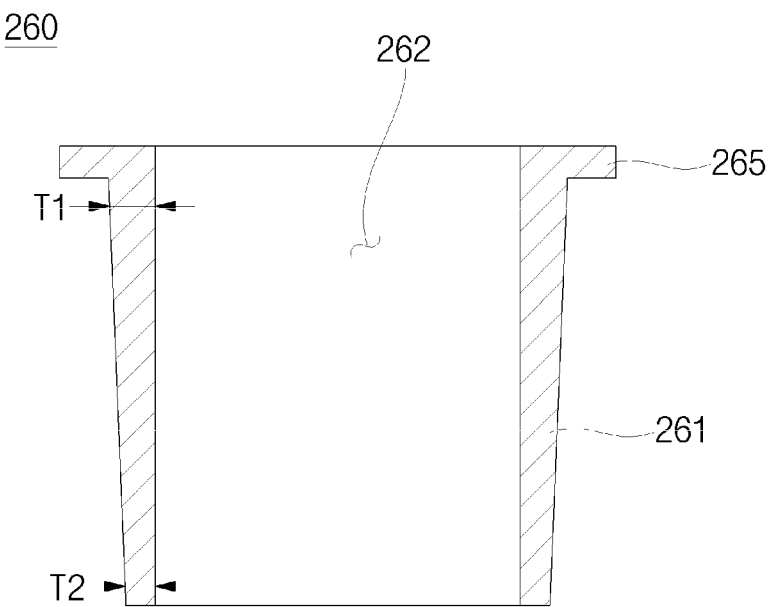
FIG. 4B is a cross-sectional view thereof.

FIG. 4A is a perspective view showing a core insulation member according to another embodiment of the present invention, and FIG. 4B is a cross-sectional view thereof.

Referring to FIGS. 4A and 4B, the core insulation member 260 may include an insertion part 261 and a flange part 265. In order to be easily inserted into the center hole 121 and the center of the winding of the electrode assembly 110, the insertion part 261 may be formed to be thinned from the top to the bottom. That is, the thickness T1 of the upper end of the insertion part 261 may be greater than the thickness T2 of the lower end (T1>T2). In this case, the inner hole 262 may be formed so that the diameters of the upper and lower ends are equal to each other. In some examples, the outer diameter of the insertion part 261 may be formed to decrease from the top to the bottom. In other words, the outer surface of the insertion part 261 may be formed to be inclined.

Figure 5A:
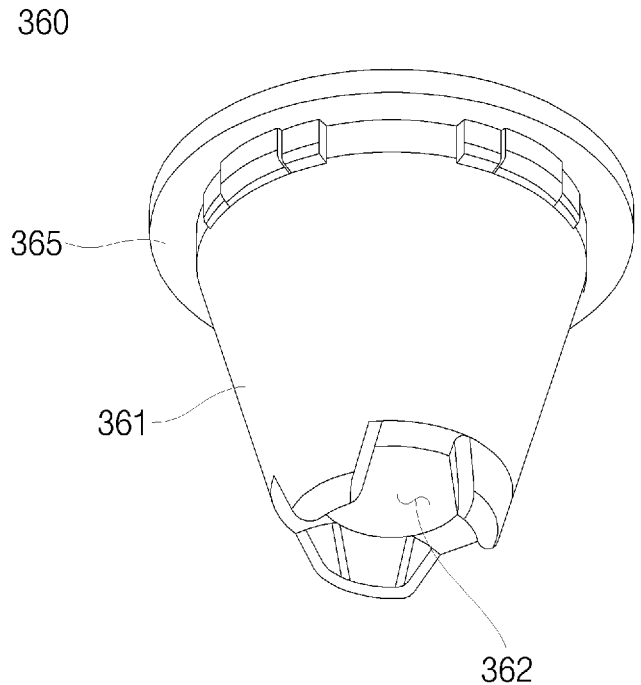
FIG. 5A is a perspective view showing a core insulation member according to another embodiment of the present invention.
Figure 5B:
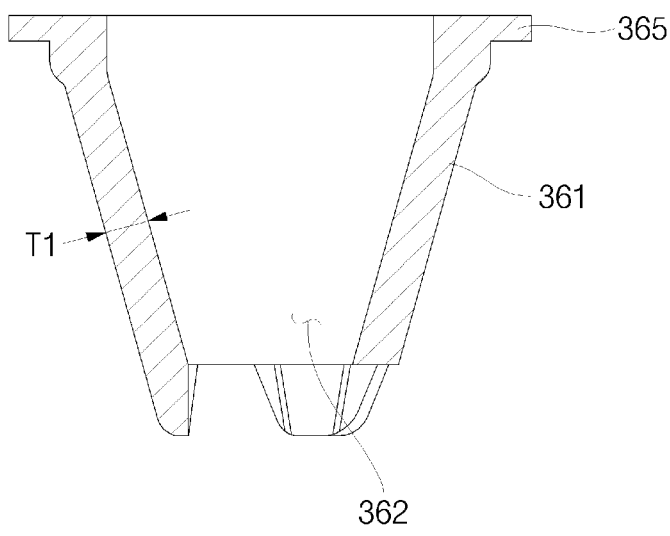
FIG. 5B is a cross-sectional view thereof.

FIG. 5A is a perspective view showing a core insulation member according to another embodiment of the present invention, and FIG. 5B is a cross-sectional view thereof.

Referring to FIGS. 5A and 5B, the core insulation member 360 may include an insertion part 361 and a flange part 365. The insertion part 361 may be formed in a funnel shape that gradually decreases in diameter from the top to the bottom. In addition, an inner hole 362 into which an electrolyte is injected may be formed inside the insertion part 361, and the inner hole 362 may be formed so that the diameter of the upper end is greater than the diameter of the lower end. In this case, the insertion part 361 may be formed to have the same thickness T1 at the upper and lower ends thereof. As described above, since the diameter of the insertion part 361 gradually decreases from the top to the bottom, the core insulation member 360 can be easily inserted into the first current collection plate 120 and the electrode assembly 110.

Figure 6:
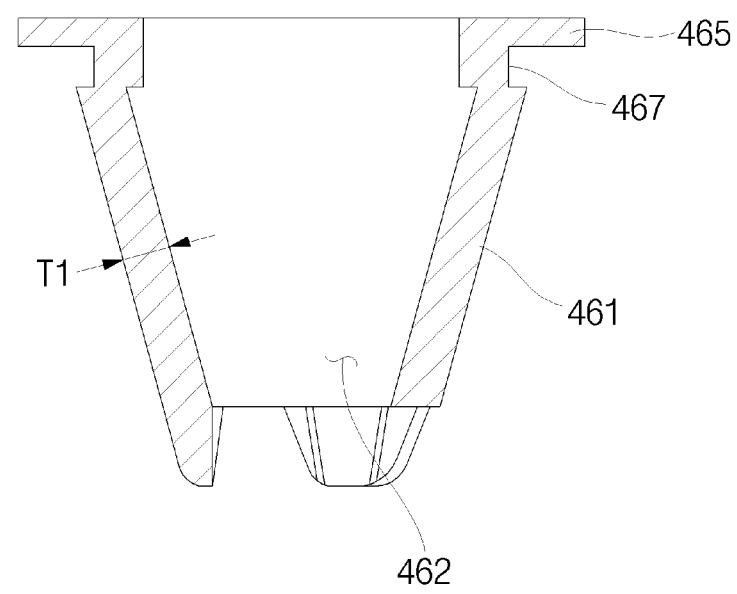
FIG. 6 is a cross-sectional view showing a core insulation member according to another embodiment of the present invention

FIG. 6 is a cross-sectional view showing a core insulation member according to another embodiment of the present invention.

Referring to FIG. 6, the core insulation member 460 may include an insertion part 461, an inner hole 462, a flange part 465, and a fixing groove 467. The core insulation member 460 of FIG. 6 is similar to the core insulation member 360 of FIG. 5B, but may further include a fixing groove 467. For example, the insertion part 461, the inner hole 462, and the flange part 465 may correspond to the insertion part 361, the inner hole 362, and the flange part 365, of FIG. 5B.

The fixing groove 467 may be formed between the flange part 465 and the insertion part 461. The fixing groove 467 may be located at a lower portion of the flange part 465 and at an upper end of the insertion part 461. The fixing groove 467 may be formed around the upper end of the insertion part 461. The fixing groove 467 may be a groove inwardly formed from the outer surface (surface) of the insertion part 461, that is, toward the center of the core insulation member 460. Accordingly, a step is generated between the fixing groove 467 and the insertion part 461. The fixing groove 467 may serve to fix the core insulation member 460 to the first current collection plate 120. For example, when the core insulation member 460 is inserted into the center hole 121 of the first current collection plate 120, the first current collection plate 1220 around the center hole 121 is inserted into the fixing groove 467. In addition, due to the step between the fixing groove 467 and the insertion part 461, the core insulation member 460 may not be easily separated from the center hole 121, and can be stably fixed to the first current collection plate 120.

Figure 7A:
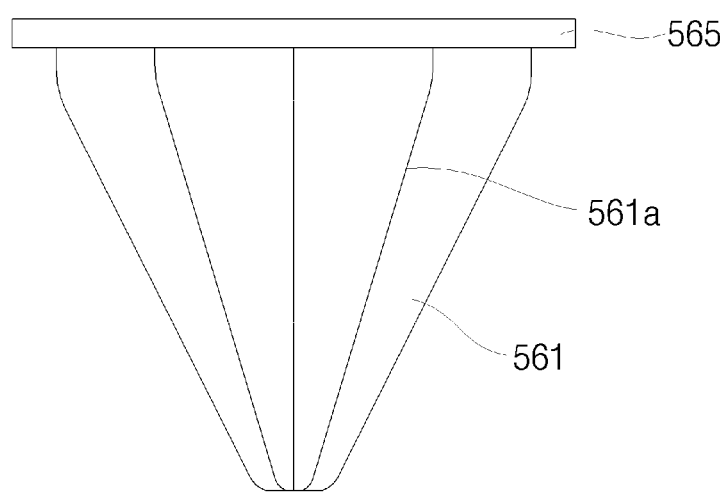
FIG. 7A is a front view showing a core insulation member according to another embodiment of the present invention.
Figure 7B:
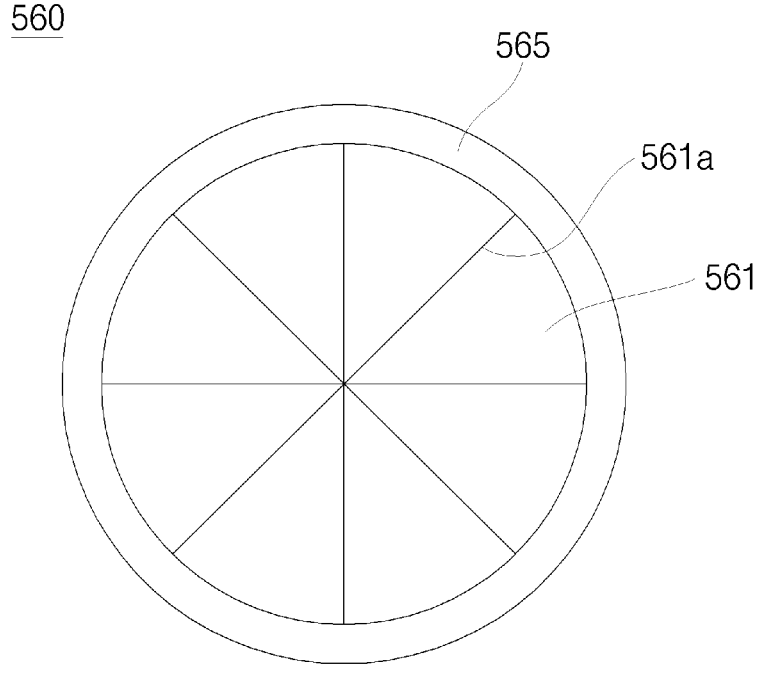
FIG. 7B is a plan view thereof.
Figure 8A:
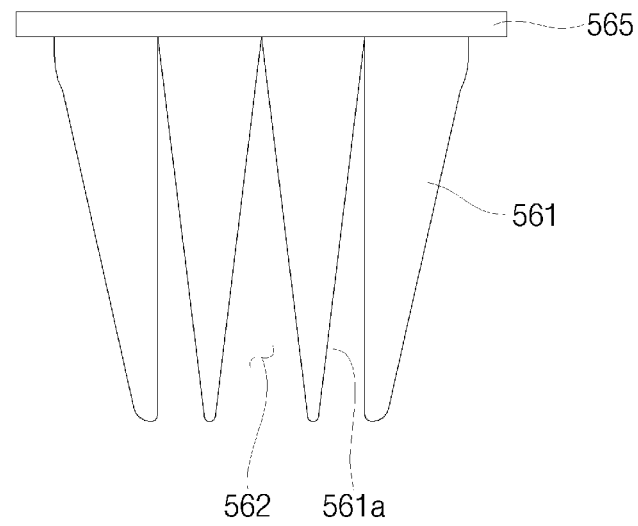
FIG. 8A is a front view showing the state of the core insulation member of FIG. 7A when electrolyte is injected.
Figure 8B:
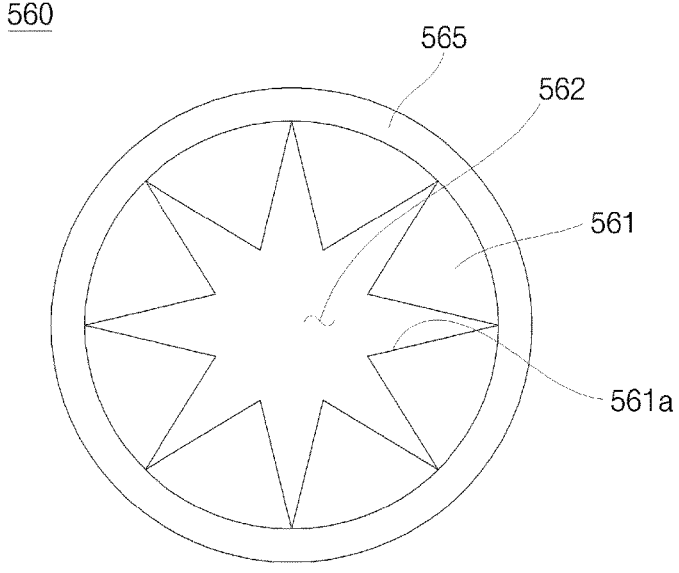
FIG. 8B is a plan view thereof.

FIG. 7A is a front view showing a core insulation member according to another embodiment of the present invention, and FIG. 7B is a plan view thereof. FIG. 8A is a front view showing the state of the core insulation member of FIG. 7A when electrolyte is injected, and FIG. 8B is a plan view thereof.

Referring to FIGS. 7A and 7B, the core insulation member 560 may include an insertion part 561 and a flange part 565. Here, the flange part 565 may be formed to correspond to the above-described flange parts 165, 265, 365, and 465.

The insertion part 561 may be separated into a plurality of regions by a cutout part 561a formed on the side thereof. The cutout part 561a may be formed to extend from the top to the bottom of the insertion part 561. The upper end of the insertion part 561 is connected to the flange part 565. In addition, as shown in FIG. 7B, in the insertion part 561, the regions separated by the cutout part 561a are in contact with each other at normal times, so that the inner hole 562 formed inside the insertion part 561 may not be seen. Meanwhile, when the core insulation member 560 is coupled to the first current collection plate 120 and the electrode assembly 110, and an electrolyte is injected, the plurality of regions of the insertion part 561 and cutout parts 561a may be separated from each other by the electrolyte. Accordingly, as shown in FIGS. 8A and 8B, when the electrolyte is injected, the cutout parts 561a of the insertion part 561 may be spaced apart from each other to form an inner hole 562, and an electrolyte may be injected into the electrode assembly 110 through the inner hole 562.

Figure 9:
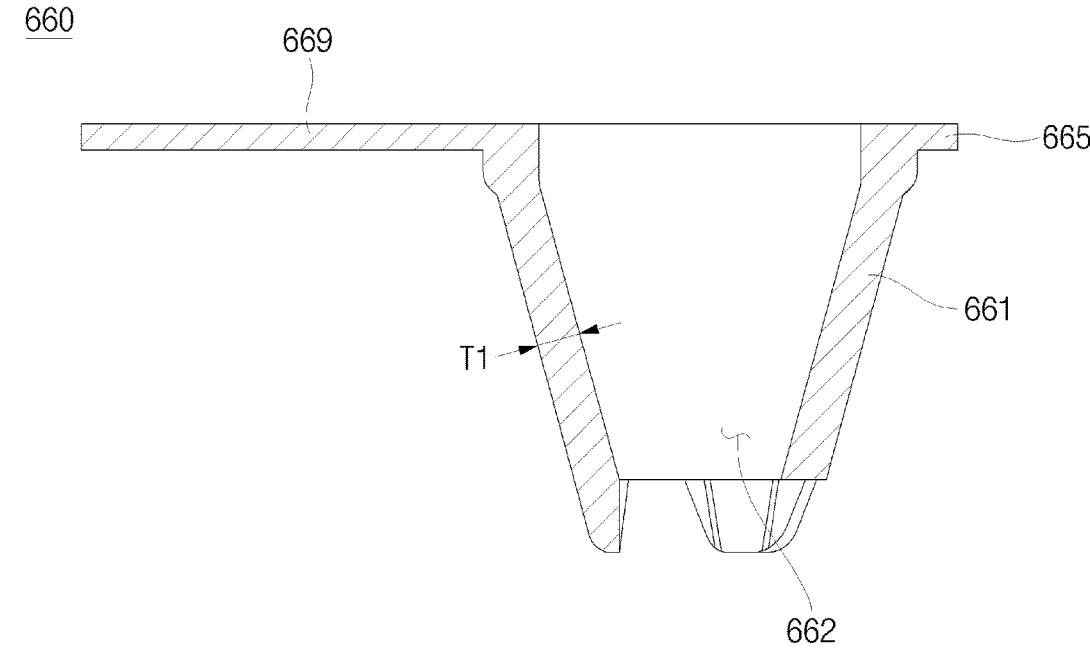
FIG. 9 is a cross-sectional view showing a core insulation member according to another embodiment of the present invention.

FIG. 9 is a cross-sectional view showing a core insulation member according to another embodiment of the present invention.

Referring to FIG. 9, the core insulation member 660 may include an insertion part 661, an inner hole 662, a flange part 665, and an extension part 669. The core insulation member 660 of FIG. 9 may be similar to the core insulation member 360 of FIG. 5B, but may further include the extension part 669. For example, the insertion part 661, the inner hole 662, and the flange part 665 may be formed to correspond to the insertion part 361, the inner hole 362, and the flange part 365, of FIG. 5B.

The extension part 669 may be formed to extend in the horizontal direction from one side of the flange part 665. In some examples, the extension part 669 may extend to an upper portion of the first current collection plate 120 to cover a portion of the peripheral hole 122. In addition, the extension part 669 may not extend from the first current collection plate 120 to a portion where the lead tab 124 is formed. That is, the core insulation member 660 includes an extension part 669 extending to one side of the flange part 665, and thus may be asymmetric. The extension part 669 extends to the upper portion of the first current collection plate 120, thereby preventing the first current collection plate 120 from being deformed or lifted when the case 140 is pressed or bent.

While the foregoing embodiment has been provided for carrying out the secondary battery according to the present invention, it should be understood that the embodiment described herein should be considered in a descriptive sense only and not for purposes of limitation, and various changes in form and details may be made therein without departing from the spirit and scope of the disclosure as defined by the following claims.

INDUSTRIAL APPLICABILITY

The present invention can be used in the field of secondary batteries.

The invention claimed is:

1. A secondary battery comprising:
an electrode assembly formed by winding a first electrode plate, a separator and a second electrode plate;
a case for accommodating the electrode assembly;
a current collection plate electrically connected to the first electrode plate and coupled to an upper part of the electrode assembly; and
a core insulation member coupled to a winding center of the electrode assembly at an upper part of the current collection plate,
wherein the core insulation member includes an insertion part having an inner hole, and a flange part extending in a horizontal direction from an upper end of the insertion part,
wherein the first electrode plate comprises an electrode uncoated portion on which an active material is not applied,
wherein the electrode uncoated portion protrudes from an upper portion of the electrode assembly and is electrically connected to the current collection plate, and
wherein a length of the insertion part is longer than a length of the electrode uncoated portion.

2. The secondary battery of claim 1, wherein the current collection plate includes a center hole formed in a center thereof, and the insertion part is inserted into the electrode assembly through the center hole.

3. The secondary battery of claim 1, wherein the length of the insertion part is greater than a length in which the first electrode plate protrudes from an upper end of the separator.

4. The secondary battery of claim 1, wherein the insertion part is formed vertically from the flange part.

5. The secondary battery of claim 1, wherein an upper diameter and a lower diameter of the inner hole are equal to each other, and a thickness of the upper end of the insertion part is greater than a thickness of a lower end of the insertion part.

6. The secondary battery of claim 1, wherein an upper diameter of the inner hole is greater than a lower diameter of the inner hole, and thicknesses of the upper end and a lower end of the insertion part are equal to each other.

7. The secondary battery of claim 1, wherein the core insulation member is extends between the flange part and the insertion part and further comprises a fixing groove to which the current collection plate is fixed.

8. The secondary battery of claim 1, wherein the insertion part comprises a cutout part that extends from a top to a bottom of the insertion part and separates the insertion part into a plurality of regions.

9. The secondary battery of claim 8, wherein when an electrolyte is injected into the case, the cutout part is opened.

10. The secondary battery of claim 1, wherein the core insulation member further comprises an extension part that extends in the horizontal direction from one side of the flange part to cover a portion of the current collection plate.

11. The secondary battery of claim 1, wherein a lead tab extends from the current collection plate at a location outside an outermost periphery of the core insulation member.

12. The secondary battery of claim 1, further comprising a second current collection plate coupled to a lower part of the electrode assembly, wherein the second current collection plate is electrically connected to the second electrode plate, wherein the second current collection plate comprises a connecting part protruding downward from the second current collection plate, and wherein the connecting part is connected to the case.

13. The secondary battery of claim 12, wherein the connecting part and a bottom plate of the case are directly connected.

14. The secondary battery of claim 1, wherein a thickness of the insertion part varies from an upper end to a lower end of the insertion part.

15. The secondary battery of claim 1, wherein an outer surface of the insertion part is inclined.

16. The secondary battery of claim 1, wherein a diameter of the inner hole varies from an upper end to a lower end of the insertion part.

17. The secondary battery of claim 1, wherein the insertion part contacts the current collection plate.

18. The secondary battery of claim 1, wherein the insertion part contacts an inner surface of the winding center.

19. The secondary battery of claim 1, wherein the current collection plate is electrically connected to a cap assembly, and wherein the case comprises a beading part for preventing movement of the electrode assembly and a crimping part for fixing the cap assembly.

20. The secondary battery of claim 19, wherein the core insulation member is disposed below the beading part.

* * * * *